United States Patent [19]
Langley et al.

[11] Patent Number: 4,463,299
[45] Date of Patent: Jul. 31, 1984

[54] CAPACITIVE SENSOR MOTOR CONTROL SYSTEM

[75] Inventors: Lawrence W. Langley, Christiansburg; Leonard N. Wedman, Radford, both of Va.; William D. Jacobson, Sierra Vista, Ariz.

[73] Assignee: Kollmorgen Technologies Corporation, Dallas, Tex.

[21] Appl. No.: 376,656

[22] Filed: May 10, 1982

[51] Int. Cl.³ ............................................. G05B 1/06
[52] U.S. Cl. .................................. 318/662; 361/278; 318/660; 318/592
[58] Field of Search ............... 318/662, 660, 592, 608, 318/638, 652, 466, 467, 721, 799; 361/278

[56] References Cited

U.S. PATENT DOCUMENTS 3,944,903  3/1976  Clegg ........................... 318/662 X
4,341,275  7/1982  Stadler et al. ................. 318/662 X

FOREIGN PATENT DOCUMENTS 0605291  4/1978  U.S.S.R. ............................ 318/662

OTHER PUBLICATIONS

Brochure by Farrand Controls Corp., "The Farrand High Gain Inductosyn ® Transducer".

Primary Examiner—B. Dobeck
Attorney, Agent, or Firm—Morgan, Finnegan, Pine, Foley & Lee

[57] ABSTRACT

A servo motor system including a position sensor located within the motor air gap to virtually eliminate mechanical compliance in the servo loop. The transducer is of a capacitive type including interleaved capacitive plates and is designed to be substantially insensitive to the magnetic field of the motor.

15 Claims, 6 Drawing Figures

CAPACITIVE SENSOR MOTOR CONTROL SYSTEM

This invention relates to an electric motor servo system and, more particularly, to such a servo system with a capacitive position sensor having an exceptionaly fast response characteristic.

BACKGROUND OF THE INVENTION

A typical electric motor servo system includes an electric motor, a shaft mounted transducer for encoding the motor shaft position or motor speed, and an amplifier for providing a motor drive signal as a function of the difference between actual motor position or speed as compared to desired position or speed. In the design of a servo system it is important to avoid sources of instability in the feed-back loop. One of the more critical instability problems, which is often the limiting factor in the design, results from the torsional compliance which causes a lag between the transducer indication and the true rotor speed or position.

Normally the system designer tries to maintain the servo operation in a range below the mechanical resonance by a factor of 10 or more. For example, in a system including a two inch diameter, 0.1 inch thick, glass disk encoder and a 0.25 inch diameter by two inches long steel shaft coupling the encoder to the rotor, the expected torsional first resonance is about 1200 Hertz. Assuming a design factor of 10, the upper response frequency limit, i.e., the highest frequency of an applied signal which the servo system will reliably follow, would be about 120 Hertz. If the encoder disk is enlarged to a three inch diameter for greater accuracy, the response frequency for the system drops to below 60 Hertz. By increasing the shaft diameter to 0.5 inches to provide a stiffer coupling the response frequency limit could be increased to about 500 Hertz. From these examples it can be seen that the torsional compliance between the rotor and the encoder is often a critical factor in limiting the frequency response of a typical servo system.

An object of this invention is to provide a servo motor system wherein torsional compliance is virtually eliminated as a constraint to the frequency response in a fast response servo system.

Another object is to provide a fast response servo system which is more compact.

SUMMARY OF THE INVENTION

The servo motor system in accordance with this invention includes a position transducer or sensor located within the motor air gap. Preferably, the stator portion of the position transducer is attached to the inner surface of the stator core and the moving portion of the position transducer is attached surrounding the rotor. By locating the transducer elements within the air gap directly attached to the rotor and stator elements of the motor there is virtually no mechanical compliance between the rotor and transducer and, hence, the mechanical compliance is virtually eliminated as a contraint in the frequency response of the system design.

Normally, it is not possible to place a transducer in the air gap of an electric motor due to the geometry of the transducer and/or due to the interaction with the magnetic field of the motor. It has been found, however, that a capacitive position transducer can be designed to fit in the motor gap without materially increasing the size of the air gap. More importantly it has also been found that a capacitive position transducer can be designed so that it is insensitive to the magnetic field of the motor and so that the transducer has no significant detrimental effect upon the motor.

With the transducer elements attached directly to the rotor and stator elements of the motor, the servo loop approaches the ultimate in mechanical stiffness and, hence, the mechanical time constant in the servo loop is not a limiting constraint. The inductive time constant of the servo loop can generally be reduced as desired by operating at higher voltages. As a result, the response frequency of the servo system can be increased substantially over what could previously be achieved in a practical servo system with comparable components and is substantially limited only by the power transfer capability of the motor and the maximum speed of the motor.

DETAILED DESCRIPTION OF THE INVENTION

Figure 1:
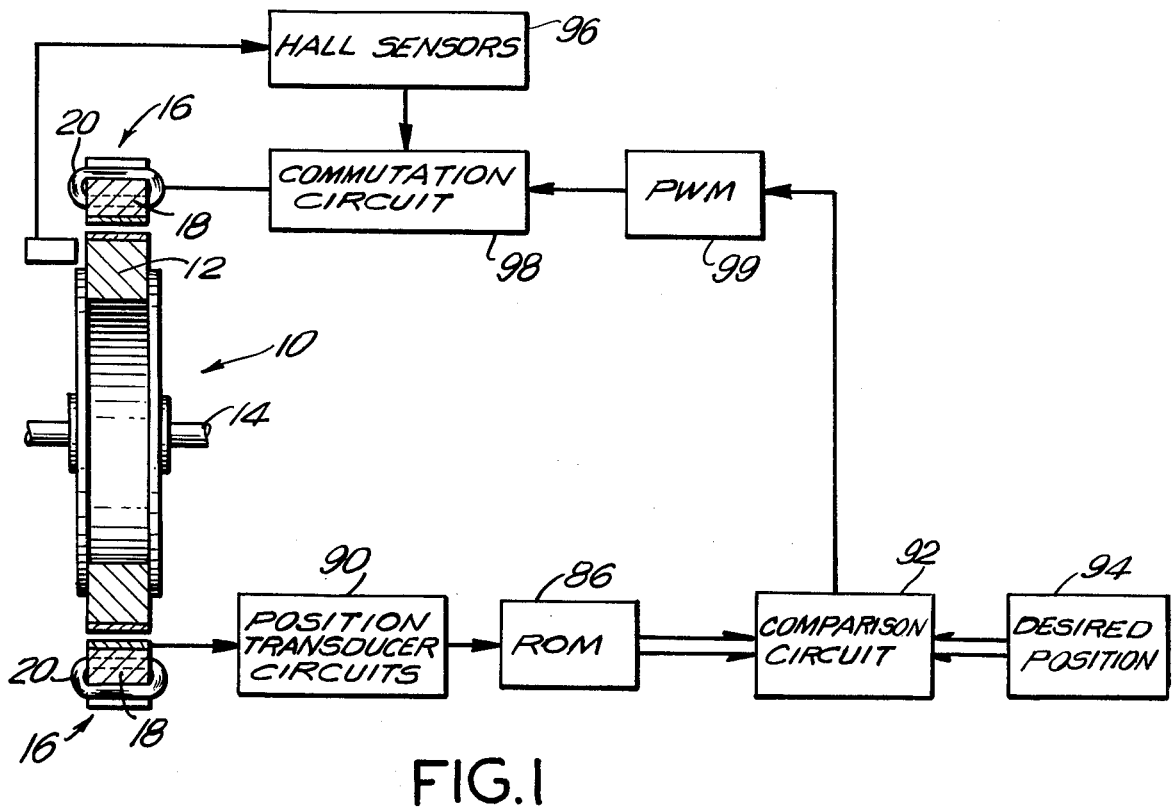
FIG. 1 is an illustration of a motor and position transducer combination in accordance with the invention together with a block diagram illustrating the servo loop.

The electric motor in the system according to the invention can be of any known type wherein an air gap exists sufficient to accommodate a capacitive type position transducer. As shown in FIG. 1, the motor may be of the brushless synchronous type with a rotor 10 including a ring 12 of permanent magnet material. The permanent magnet ring is magnetized to provide alternating north and south poles on the outer circumference of the ring. The permanent magnet ring can be formed by a plurality of successive alnico magnets or can be made of ceramic magnetic material like ferric oxide magnetized to provide the desired magnetic poles. Preferably, however, for high performance motors the magnet material is a samarium-cobalt composition which is magnetized to provide the desired magnetic poles. The magnet ring is suitably mounted for rotation on a motor shaft 14.

The stator portion of the motor includes a cylindrical laminated iron core structure with slots extending radially outwardly from the air gap. The windings for the motor are placed in the stator slots and can be in the form of a conventional three-phase Wye configuration. As will be explained hereinafter, energization of the windings through the commutation circuitry provides a rotating magnetic field.

Figure 2:
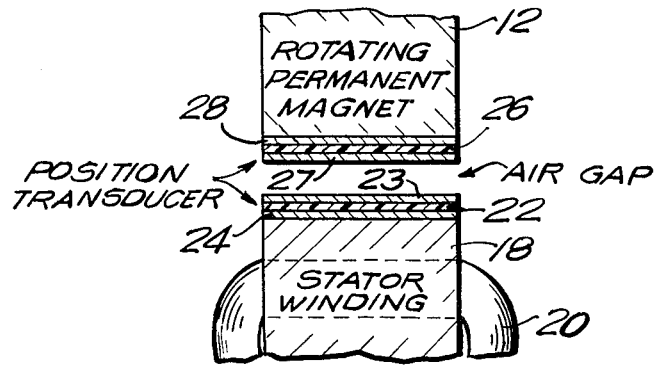
FIG. 2 is a detail of the air gap portion of the motor illustrated in FIG. 1 showing the location of the transducer elements.

As is best seen in the detail provided in FIG. 2, the position transducer is located in the air gap of the motor. The stationary portion of the transducer includes a series of capacitive plates formed by a printed circuit pattern 23 on a thin substrate 22. This printed circuit pattern is secured to the inner circumference of the stator core 18. Preferably the printed circuit pattern also includes a ground plane conductor pattern 24 on the reverse side of the substrate. The moving portion of the position transducer likewise includes a series of capacitive plates which are formed by a printed circuit pattern 27 on the surface of substrate 26. The reverse side of substrate 26 preferably also includes a conductor pattern 28 forming a ground plane. The moving conductor pattern is secured surrounding permanent magnet ring 12 of the rotor.

Figure 3:
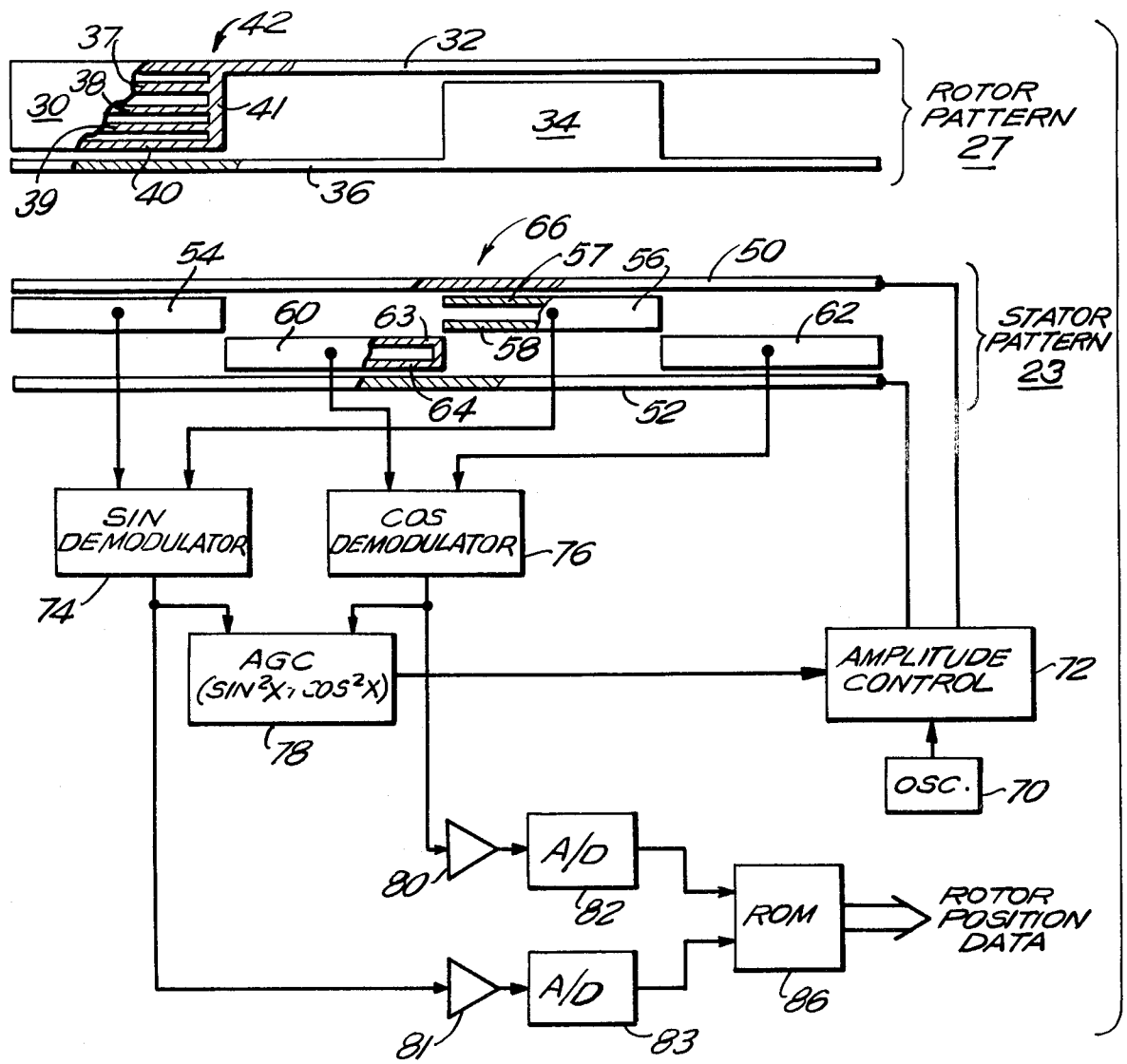
FIG. 3 is an illustration showing the conductor patterns of the rotor and stator portions of the transducer together with circuits for producing rotor position data.

The moving transducer conductor pattern 27 is shown in the upper portion of FIG. 3 and includes two capacitive plates 30 and 34. Plate 30 is integral with a longitudinal strip 32 running the length of the pattern and plate 34 is similarly integral with a strip 36. The length of the pattern corresponds to the circumference of rotor permanent magnet ring 12 so that when the pattern is mounted strips 32 and 36 form conductive rings surrounding the rotor. Capacitive plates 30 and 34 each cover a 90 degree arc section of the rotor circumference. To minimize eddy current losses plates 30 and 34 are preferably in the form of comb-like patterns (shown in detail 42) where circumferentially extending fingers 37-40 are joined to strip 32 at one end by conductor 41.

The stationary conductor pattern for the transducer includes strips 50 and 52 which are aligned with strips 32 and 36, respectively, of the rotor pattern. Accordingly, when the stationary pattern is mounted on the inner circumference of the stator, strips 50 and 52 form stationary rings for coupling energy to the moving plates 30 and 34 via the rings formed by strips 32 and 36.

The stationary portion of the transducer also includes a pair of capacitive plates 54 and 56 which are aligned with plates 30 and 34 to provide a modulated sine wave output. Furthermore, the stationary pattern includes a second set of capacitive plates 60 and 62 which occupy the arcuate positions between plates 54 and 56 to provide a modulated cosine output. Thus, plate 54 occupies 0-90 degrees of arc, plate 60 occupies 90-180 degrees of arc, plate 56 occupies 180-270 degrees of arc and plate 62 occupies 270-360 degrees of arc. Plates 54, 56, 60 and 62 are shown each occupying approximately half the width of the transducer to provide the best signal separation but could be wider provided the separate plate identities are maintained. To reduce eddy current losses the plates can be formed in comb-like configurations as shown in detail 66 such that, for example, plate 56 is formed by strips 57 and 58 joined at the end not shown and plate 60 is formed by strips 63 and 64 joined at one end as shown. Strips 57 and 58 are aligned with strips 37 and 38 of the rotor pattern and strips 63 and 64 are aligned with strips 39 and 40.

Leads from the various sections of the stator conductor pattern can be brought out by any suitable means such as by through-hole connections to conductors on the opposite side of the substrate.

Ground planes 24 and 28 (FIG. 2) on the reverse side of the substrates are desirable for reducing noise in the transducer output signals. The ground planes are preferably formed by circumferential strips joined by a single transverse conductor to thereby avoid unnecessary eddy current losses.

The transducer is energized by an oscillator 70 preferably operating at about 100 Kilohertz. The oscillator is coupled to strips 50 and 52 via an amplitude control unit 72. Energy from the oscillator is coupled from strips 50 and 52 to strips 32 and 36 for energizing moving plates 30 and 34. In this manner the moving plates are energized without requiring brushes or slip rings.

Figure 4:
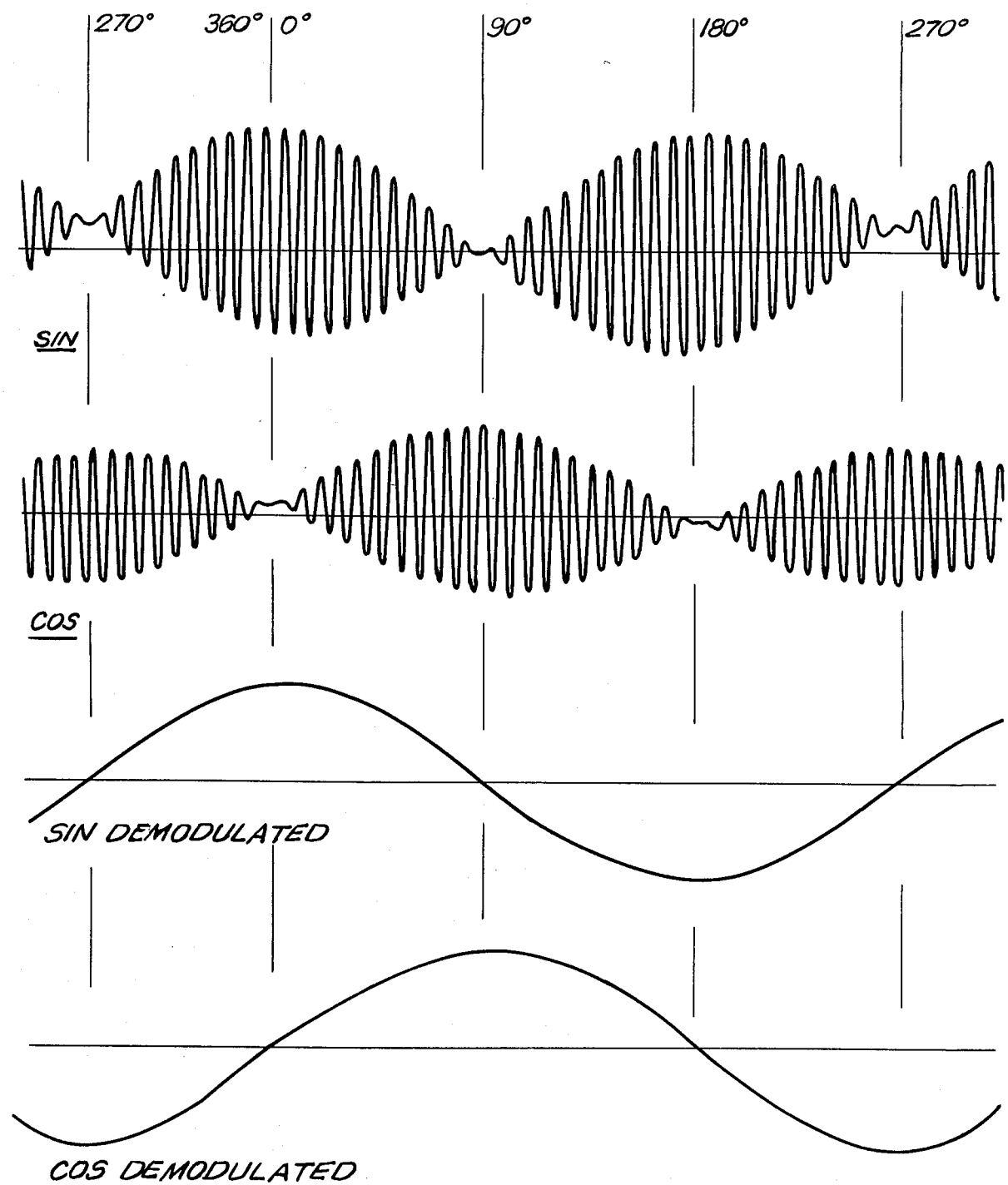
FIG. 4 is an illustration showing various wave forms appearing in the system shown in FIG. 3.

The coupling of energy from the moving pattern to the stationary pattern to develop the position indicia is as illustrated in FIG. 4. If the rotor and stator patterns are aligned as shown in FIG. 3 (referred to as the zero position) there is a maximum coupling of signal to plates 54 and 56 to provide a sine signal of maximum amplitude. If the rotor moves 90 degrees the plates are misaligned so that there is a minimum coupling of energy. At 180 degrees coupling of energy is again maximum but of reverse polarity. At 270 degrees the coupled energy is again minimal. Thus, 360 degrees of rotor movement produces one cycle of the modulated sine wave shown in the upper trace in FIG. 4.

Plates 60 and 62 are displaced by 90 degrees relative to plates 54 and 56 and, therefore, they provide a similar modulated wave shape but it is displaced by 90 degrees, i.e., the cosine wave shown in the second trace from the top of FIG. 4.

Plates 54 and 56 are connected to a sine demodulator circuit 74 to demodulate the sine wave and recover the envelope shown in the third trace of FIG. 4. Similarly, plates 60 and 62 are connected to a cosine demodulator circuit 76 to demodulate the cosine wave and recover the envelope shown in the bottom trace of FIG. 4.

The outputs from demodulators 74 and 76 are supplied to automatic gain control (AGC) circuit 78 which computes the value of $\sin^2 X + \cos^2 X$ using analog computing elements. Since the sum of $\sin^2 X$ and $\cos^2 X$ is always unity regardless of rotor position, this sum is suitable for use in controlling the amplitude of the energizing signal from oscillator 70. The amplitude of the energizing signal is automatically adjusted via amplitude control circuit 72 to maintain the value of $\sin^2 X + \cos^2 X$ at unity. The values of the demodulated signals can then be taken as representative of position.

The output of sine demodulator 74 is supplied to an analog to digital (A/D) converter 83 through an amplifier 81 and the output of cosine demodulator 76 is supplied to analog to digital (A/D) converter 82 through amplifier 80. The digital outputs from converters 82 and 83 are supplied as the address inputs to a read only memory (ROM) 86.

From FIG. 4 it can be seen that the values of the demodulated sine and cosine signals taken together provide a unique set of values for each angular position of the rotor. Memory 86 is programmed to contain a look-up table for converting the sine and cosine address values into angular rotor positions in digital form.

FIG. 1 shows the servo loop using the position data provided by ROM 86 previously referred to in FIG. 3.

The stator windings are energized by a commutation circuit 98 controlled by rotor position signals from Hall detectors displaced 60 electrical degrees from one another. The signals from the Hall sensors are used to control solid state switches connected to the windings. A suitable arrangement including six transistors in a switching bridge configuration is shown in application Ser. No. 282,796 filed July 13, 1981 entitled "Brushless Motor Controller", incorporated herein by reference.

The position transducer circuits 90, previously described in FIG. 3, supply the position address data to ROM 86 which converts the data into angular position values. A digital comparator 92 receives the actual position data from ROM 86 and the desired position data from an input circuit 94 and calculates the difference or error. The difference is supplied to a pulse width modulator (PWM) circuit 99 to control the average energization level to the windings via the commutation circuit 98. In conventional servo loop fashion, the motor tends to move toward the desired position to eliminate the error signal.

With the position transducer shown in FIG. 3, the pitch of the pattern is equal to one revolution, i.e., it requires one complete revolution of the pattern before it begins to repeat. If care is taken to minimize noise in the system, such a transducer can provide accurate position data to 1/100th of the pitch. The patterns shown in FIG. 3 can thus potentially indicate angular positions to within 4 degrees. Noise sources that can adversely affect accuracy are closure errors resulting from differences between the circumference dimensions and the length of the transducer patterns, air gap variations between the moving and stationary transducer elements, skew of the transducer pattern and pattern defects. Noise is also generated by the motor itself, the circuit components and temperature drift.

Finer position indications can be achieved by reducing the pitch of the transducer pattern to a fraction of a revolution. The system is still capable of indicating position to 1/100th of the pitch and, hence, the finer pitch transducer pattern provides correspondingly finer position indications. It is important that the air gap between the transducer elements not exceed a few percent of the pitch distance. Thus, for a motor airgap in the range of 0.008 to 0.010 inches, the reasonable minimum pitch distance for the transducer would be about 0.100 inches. Printed circuit techniques are available for producing transducers with a pitch as fine as 10 mils, but 100 mils is a better practical limit for most motor designs. Such transducers can be made to customer specifications by Farrand Industries Inc of Walhalla, N.Y.

The disadvantage of transducers in the motor with a pitch at a fraction of a revolution is that, where absolute position indications are required, an additional position indicator must be added to the system to indicate the present position sector. For example, if the pattern has a pitch of 1/12th of a revolution, the pattern of the transducer repeats 12 times per revolution and position is indicated within twelve-30 degree segments. A suitable system for indicating the specific sector can be provided by including a marker position on the transducer to indicate a zero position indication. The marker position indication would be used in combination with a counter for counting zero crossings of the demodulated transducer outputs. In such an arrangement the counter provides a course position indication, i.e, a sector position, and the normal transducer output provides the fine position indication within the sector.

Figure 5:
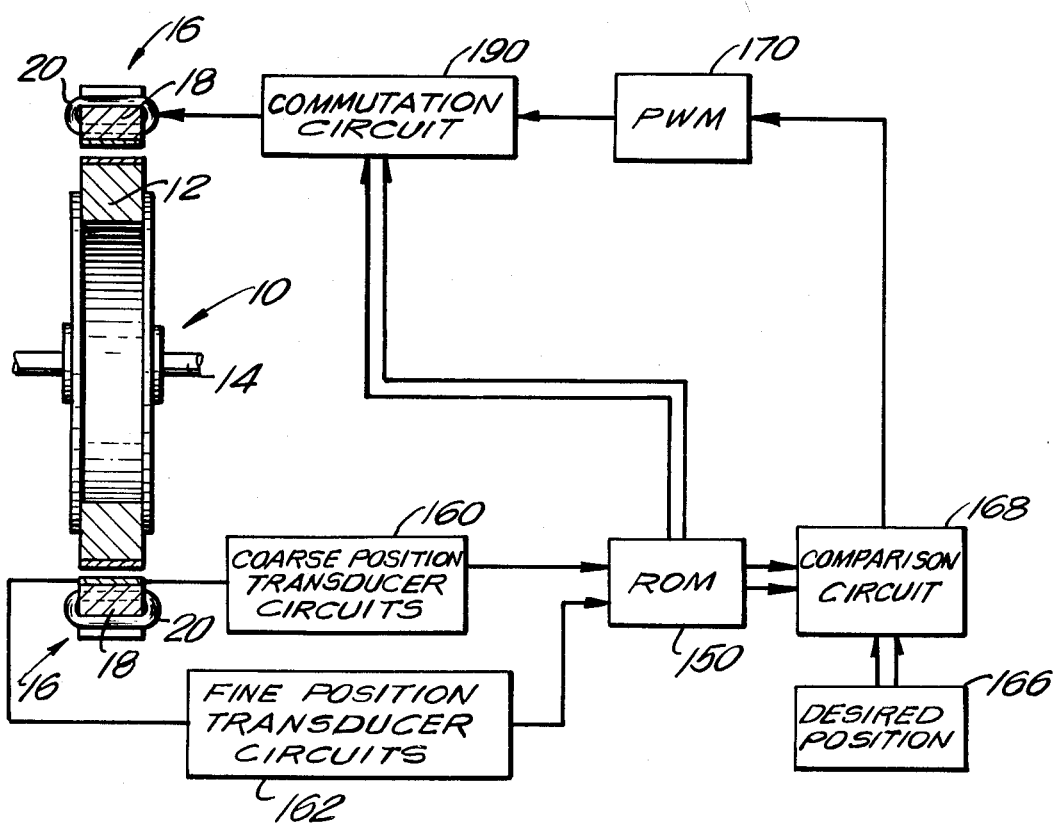
FIG. 5 illustrates a system in accordance with another embodiment of the invention including both a coarse and a fine position transducer.
Figure 6:
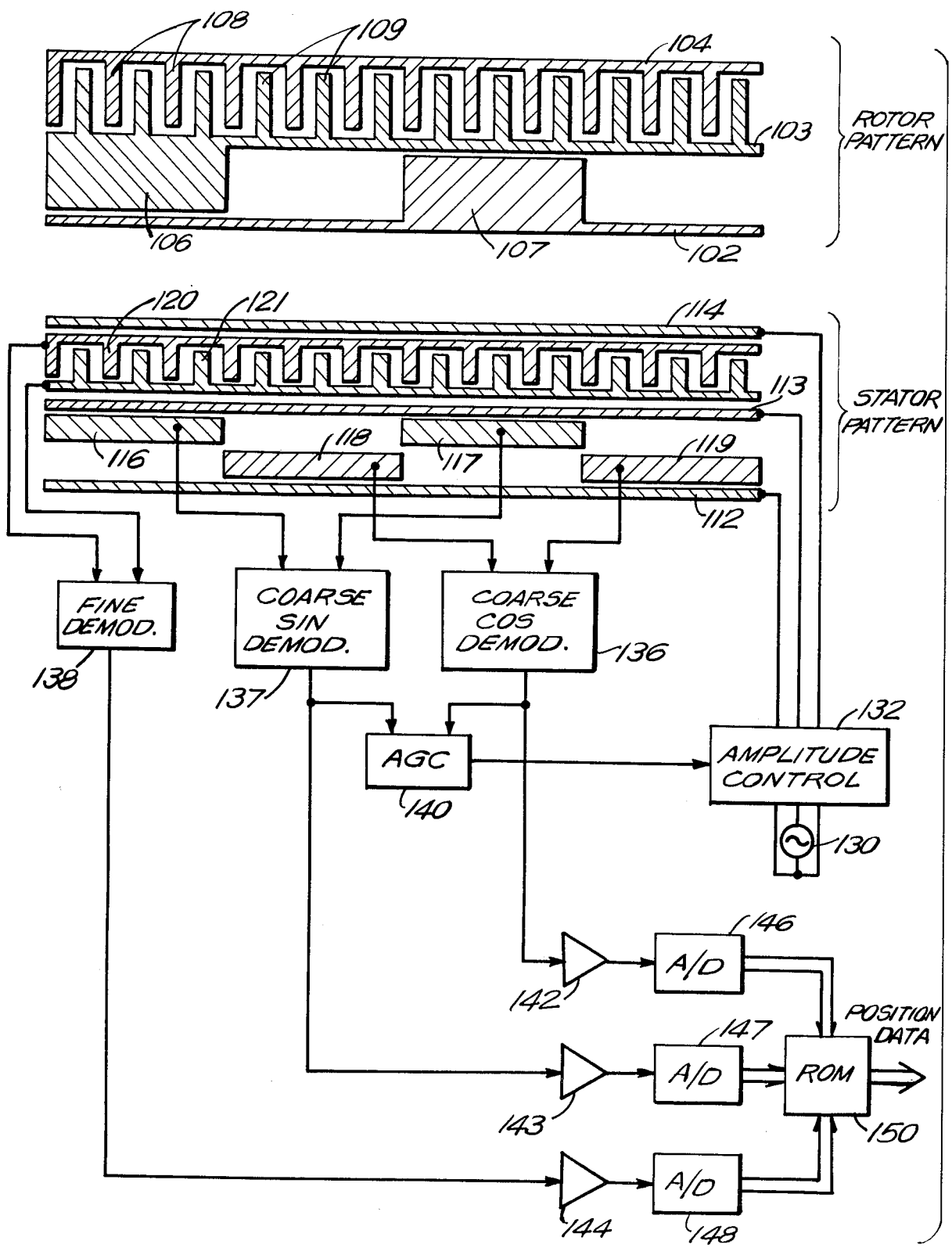
FIG. 6 is an illustration of the rotor and stator transducer patterns for the system of FIG. 5 and the associated circuits for providing rotor position data.

Another technique for providing fine position indications using capacitive transducers located within the motor airgap is illustrated in FIGS. 5 and 6 wherein the transducer pattern includes a coarse pattern having a pitch equal to one revolution and a fine pattern having pitch equal to 1/12 of a revolution.

The moving portion of the transducer pattern is shown in the upper part of FIG. 6 and includes 3 parallel strips 102-104 which form rings surrounding the rotor when the pattern is in place. Capacitive plates 106 and 107 each cover 90 degrees segments of the surface and are integral with strips 103 and 102, respectively. Plates 106 and 107 are equally spaced and form the moving portion of the course position transducer.

The fine portion of the position transducer includes capacitive plates 108 which are integral with strip 104 and plates 109 which are integral with strip 103. Plates 108 and 109, as shown, form an interleaved comb-like pattern which repeats 12 times and hence has a pitch of 1/12 of a revolution.

The stationary transducer pattern includes strips 112-114 which are aligned with strips 102-104, respectively, of the rotating pattern. When in place inside the motor core, strips 112-114 form rings for coupling energy to the moving pattern.

The stationary pattern also includes plates 116 and 117 aligned with plates 106 and 107 for generating the sine signal and plates 118 and 119 interleaved therewith to provide the cosine signal. Plates 116-119 together with plates 106 and 107 form the coarse portion of the transducer which is similar to that previously described in FIG. 3.

The stationary pattern further includes interleaved comb-like patterns 120 and 121 aligned with the moving pattern formed by plates 108 and 109. Patterns 120-121 and 108-109 form the fine position portion of the transducer.

The transducer is energized from an alternating current source 130 via an amplitude control circuit 132. An alternating signal is applied to strips 113 and 114 for coupling energy to strips 103 and 104 of the moving pattern to energize plates 108 and 109. Similarly, energy is applied between strips 112 and 113 from where it is coupled to strips 102 and 103 to energize plates 106 and 107 of moving pattern.

Plates 116 and 117 are connected to a coarse sine demodulator circuit 137 and plates 118 and 119 are connected to a course cosine demodulators circuit 136. The outputs from modulator circuits 136-137 are coupled to an automatic gain control (AGC) circuit 140 which calculates the value of $\sin^2 X + \cos^2 X$. The automatic gain control circuite is connected to amplitude control circuit 132 to control amplitude of the energization signal supplied to the transducer in the manner previously described in connection with FIG. 3.

Patterns 120 and 121 are connected to a fine signal demodulator circuit 140 which decodes the modulated signal from the fine position portion of the transducer. The output of demodulator 140 is a sine wave including 12 cycles per motor revolution.

The outputs from demodulator circuits 136-138 are supplied to analog to digital (A/D) converters 146-148 via amplifiers 142-144 respectively. The digital outputs from the converter circuits are supplied as address inputs to a read only memory (ROM) 150. The ROM can be a conventional memory unit with a 16 bit addressing capability, 8 bits from A/D converter 148 indicating the fine position and 4 bits from each of the A/D converters, 146 and 147 indicating the course position sector. The combination of the outputs from A/D converters 146-148 provides a unique address for each position of the transducer.

A servo loop system including the position data as provided in FIG. 6 is illustrated in block diagram form in FIG. 5. Components 136, 137, 142, 143, 146 and 147 form the course position transducer circuits 160 and components 138, 144, and 148 form the fine position transducer circuit 162. Circuits 160 and 162 provide the previously discussed address inputs for ROM 150.

Since the output of ROM 150 provides a rotor position indication, this output can be used directly to control commutation thereby eliminating the need for Hall sensors or the like. Details on the use of a ROM output to control commutation in a brushless DC motor is more fully described in application Ser. No. 282,796 previously referred to herein.

A comparator circuit 168 is used to compare the actual position indication, as provided by the output of ROM 150, and the desired position indication, as provided by an input circuit 166. The output of comparator 168 is supplied to a pulse width modulation (PWM) circuit 170 which in turn controls the average amplitude of the winding energization signal furnished through commutation circuit 190. The system operates in conventional servo loop fashion where the motor is energized in a direction moving toward the desired position to thereby eliminate the error signal produced by comparator 168.

While only a few illustrative embodiments have been described in detail it should be apparent that there are numerous other variations within the scope of this invention. The invention is more particularly defined in the appended claims.

We claim:
1. A brushless servo motor comprising:
a stator structure;
a rotor mounted for rotation relative to said stator and dimensioned to provide an air gap between said rotor and said stator;
a set of windings to said motor operational when energized to cause rotation of said rotor relative to said stator; and
a capacitive position transducer located in said air gap including,
a stationary set of interleaved conductive plates insulated from, but attached to, the air gap circumference of said stator, and
a moving set of interleaved conductive plates insulated from, but attached to, the air gap circumference of said rotor.

2. An electric servo motor according to claim 1 wherein said winding is on said stator and wherein said rotor includes rotating permanent magnets.

3. An electric servo motor according to claim 1 wherein the pitch of the pattern of said transducer is equal to one revolution.

4. An electric servo motor according to claim 1 wherein said capacitive position transducer further includes:
a second stationary set of interleaved conductive plates, and
a second moving set of interleaved conductive plates, and
wherein said second sets of conductive plates have a pitch different than that of the other sets of conductive plates.

5. An electric servo motor according to claim 1 wherein said transducer further includes a plurality of stationary rings aligned with a plurality of moving rings, said moving rings being electrically connected to said moving interleaved conductive plates and being operable to couple energy from said stationary rings to said moving conductive plates.

6. An electric servo motor according to claim 1 wherein one of said sets of capacitive plates includes a portion for providing a signal indicating sine (X) and another portion displaced one quarter pitch therefrom to provide a signal indicating cosine (X) where (X) is the angular rotor position.

7. In an electric servo system, the conbination of:
brushless electric motor including a rotor, a stator, and an air gap between said rotor and stator;
a non-magnetic position transducer located within said air gap to indicate the position of said rotor relative to said stator;
an actual position indicating means coupled to said position transducer to provide a signal indicating the actual position of said rotor;
a desired position indicating means for providing a signal indicating the desired position for said rotor;
a comparator for providing an error signal corresponding to the difference between said signal indicating actual position and said signal indicating desired position; and
a drive circuit coupled to said comparator and operable to energize said motor in accordance with said error signal.

8. An electric servo system according to claim 7 wherein said transducer is capacitive.

9. An electric servo system according to claim 8 wherein said position transducer located in said air gap includes, a stationary set of interleaved conductive plates insulated from, but attached to, the air gap circumference of said stator, a moving set of interleaved conductive plates insulated from but attached to, the air gap circumference of said rotor.

10. An electric servo system according to claim 9 further including a plurality of stationary rings aligned with a plurality of moving rings, said moving rings being connected to said moving conductive plates.

11. An electric servo system according to claim 9 wherein said position transducer produces signals indicating the value of sine (X) and cosine (X) where (X) is the angular rotor position.

12. A servo system according to claim 11 further including means for calculating the value of $(\text{sine}^2 X + \text{cosine}^2 X)$ and means for energizing said transducer so as to maintain a predetermined constant value of $(\text{sine}^2 X + \text{cosine}^2 X)$.

13. An electric servo system according to claim 9 wherein the pitch of the pattern of said transducer is equal to one revolution.

14. An electric servo system according to claim 9 wherein the pitch of the pattern of said transducer is less than one revolution.

15. An electric servo system according to claim 9 wherein said transducer includes two patterns, one of said patterns havig a pitch equal to one revolution and the other having a pitch less than one revolution.

* * * * *